(12) United States Patent
Thomson

(10) Patent No.: US 12,508,496 B2
(45) Date of Patent: Dec. 30, 2025

(54) AUTOMATED GAME BOARD APPARATUS

(71) Applicant: Stephen John Thomson, Chelsea (AU)

(72) Inventor: Stephen John Thomson, Chelsea (AU)

( * ) Notice: Subject to any disclaimer, the term of this patent is extended or adjusted under 35 U.S.C. 154(b) by 524 days.

(21) Appl. No.: 18/245,588

(22) PCT Filed: Aug. 11, 2021

(86) PCT No.: PCT/AU2021/050879
§ 371 (c)(1),
(2) Date: Mar. 16, 2023

(87) PCT Pub. No.: WO2022/056574
PCT Pub. Date: Mar. 24, 2022

(65) Prior Publication Data
US 2023/0364497 A1 Nov. 16, 2023

(30) Foreign Application Priority Data
Sep. 17, 2020 (AU) ................ 2020903325

(51) Int. Cl.
A63F 3/02 (2006.01)
A63F 3/00 (2006.01)
A63F 9/34 (2006.01)

(52) U.S. Cl.
CPC ............ *A63F 3/02* (2013.01); *A63F 3/00643* (2013.01); *A63F 2003/0063* (2013.01); *A63F 2009/345* (2013.01)

(58) Field of Classification Search
CPC ............ A63F 3/02; A63F 3/00643; A63F 2003/0063; A63F 2009/345; A63F 2009/248; A63F 2009/2485; A63F 9/34
See application file for complete search history.

(56) References Cited

U.S. PATENT DOCUMENTS 2,472,916 A   6/1949 Moon
3,680,865 A   8/1972 Davis
(Continued)

FOREIGN PATENT DOCUMENTS

CN   206198655 U   5/2017
CN   111562844 A   8/2020
(Continued)

OTHER PUBLICATIONS

Rath, P. K., et al.; "Autonomous Chess Playing Robot" 2019 28th IEEE International Conference on Robot and Human Interactive Communication (RO-MAN). IEEE, 2019.
(Continued)

Primary Examiner — Tuyen K Vo
(74) Attorney, Agent, or Firm — Brooks Kushman P.C.

(57) ABSTRACT

An automated game board apparatus configured to, upon receiving a command from a player, determine a path from an origin segment to a destination segment and automatically move a selected game piece from the origin segment to the destination segment; wherein, if one or more intermediate segments along the path are occupied by other game pieces, the selected piece is moved along the boundaries of the occupied segment; and wherein, if the destination segment is occupied, the apparatus is further configured to automatically replace the existing game piece with the selected game piece by moving the existing game piece to substantially the boundary of the destination segment and moving the selected game piece to substantially the centre of the destination segment. In preferred embodiments, the invention utilizes electromagnets, correlated electromagnet array technology (CEAT), and/or correlated magnets.

15 Claims, 15 Drawing Sheets

(56) References Cited

U.S. PATENT DOCUMENTS

| | | | |
|---|---|---|---|
| 6,082,735 A * | 7/2000 | Kintner | A63F 3/00176 |
| | | | 273/261 |
| 7,963,818 B2 | 6/2011 | Fullerton et al. | |
| 11,110,341 B2 * | 9/2021 | Knippen | G09B 19/22 |
| 2007/0176362 A1 * | 8/2007 | Hohenstein | A63F 3/02 |
| | | | 273/260 |
| 2013/0314184 A1 | 11/2013 | Richards et al. | |
| 2014/0274261 A1 * | 9/2014 | Aminy | A63F 3/02 |
| | | | 463/14 |
| 2015/0357108 A1 | 12/2015 | Fullerton et al. | |
| 2018/0140936 A1 * | 5/2018 | Hovey | A63F 13/24 |
| 2018/0221757 A1 * | 8/2018 | Pickett | A63F 3/02 |
| 2018/0229105 A1 * | 8/2018 | Sanchez | A63F 3/00697 |
| 2020/0206601 A1 | 7/2020 | Martin, III et al. | |
| 2020/0282297 A1 | 9/2020 | Mehta et al. | |
| 2022/0032167 A1 * | 2/2022 | McCoy | B25J 11/003 |

FOREIGN PATENT DOCUMENTS

| | | | | |
|---|---|---|---|---|
| DE | 3931343 A1 | 3/1991 | | |
| EP | 3185255 A1 | 6/2017 | | |
| WO | WO-03006124 A1 * | 1/2003 | | A63F 3/02 |

OTHER PUBLICATIONS

Chessboard that moves pieces on its own, Viewed on the Internet on Sep. 17, 2021, youtube.co/watch.
International Search report for PCT/AU2021/050879, prepared by the Australian Patent Office, mailing date Sep. 24, 2021, 16 pages.

* cited by examiner

Figure 7B(1)
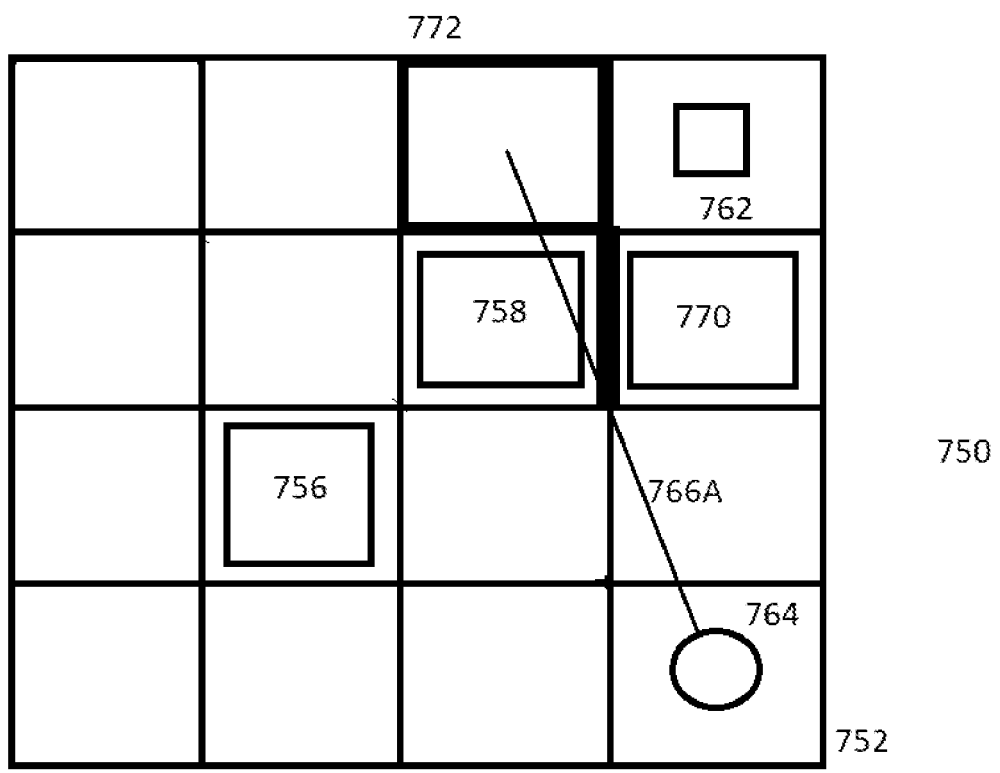

Figure 10B(1)
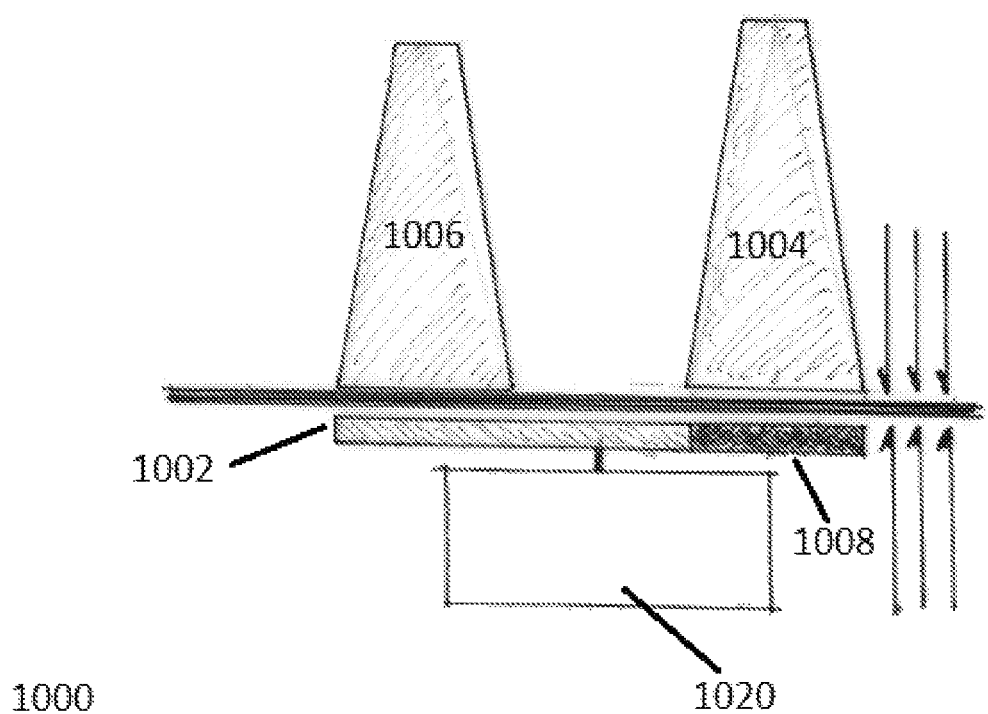

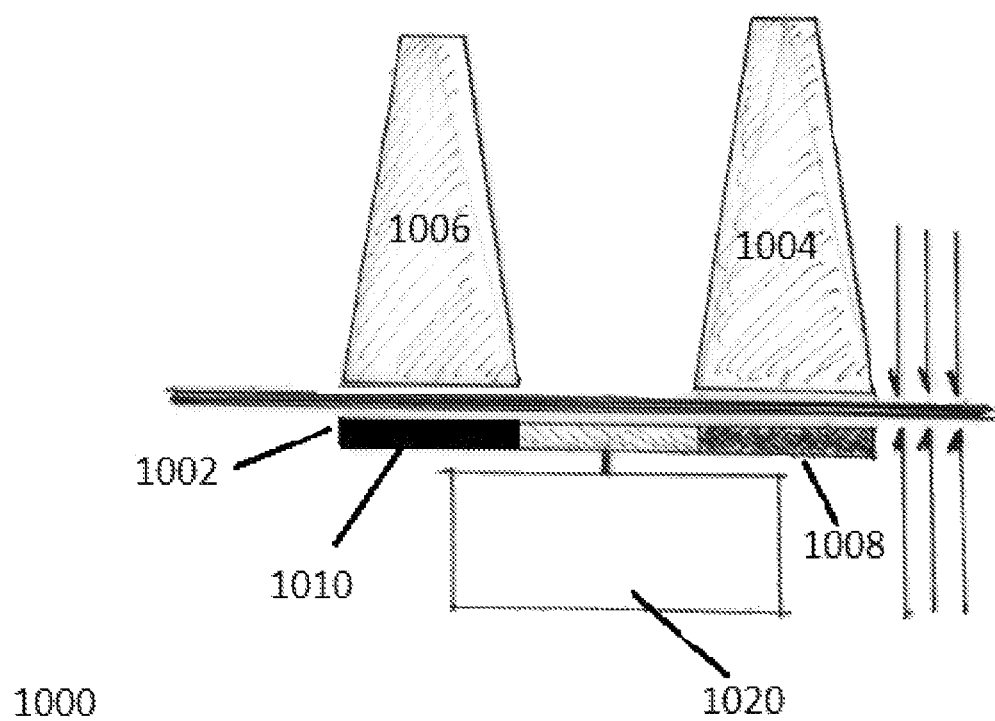
Figure 10B(2)

AUTOMATED GAME BOARD APPARATUS

CROSS-REFERENCE TO RELATED APPLICATION

This application is the U.S. national phase of PCT Application No. PCT/AU2021/050879 filed on Aug. 11, 2021, which claims priority to AU Patent Application No. 2020903325 filed on Sep. 17, 2020, the disclosures of which are incorporated in their entirety by reference herein.

FIELD OF THE INVENTION

The present invention relates to an apparatus for an automated board game, and more particularly for a board game comprising a physical board and physical pieces. The invention has particular application to games such as chess, but can also be used with a variety of other games.

BACKGROUND

The incorporation of magnets into board games is known. This can be for a variety of reasons, including to simply prevent the pieces from falling off the board, or to assist in sorting the pieces once the game is over.

There has been some use of magnets to cause movement of the pieces in the course of the game itself. For instance, US2020206601 and CN206198655 disclose a game board having pieces disposed under a transparent cover, with a magnetic "pen" used to drag a selected piece into place. U.S. Pat. No. 3,680,865 discloses relative magnetism between the pieces to attract or repel them from each other, mimicking "capture" of one piece by another. In U.S. Pat. No. 2,472,916 and DE3931343, parts of the game board are magnetized to encourage the movement and slotting into place of a selected piece.

However, such attempts at magnetizing the movement of game pieces are relatively unsophisticated. The limited range of magnetic attraction means magnetically-induced movement is relatively constrained, and/or the "actuator" of the movement must be positioned in close proximity to the target piece, making it a cumbersome exercise. At the same time, other pieces within magnetic range may be inadvertently caused to move. Furthermore, the resulting movement tends to be relatively imprecise, with the target piece often not landing exactly where intended, and/or causing movement of other pieces by accident.

In games with more complicated rules, such as chess, game rules often require a piece to move along a predetermined trajectory. Even if the path is clear, magnets may be hard-pressed to accomplish this. The more so if there are other pieces along the trajectory that need to be bypassed. Moreover, there is often another piece already on the "target" square. Where a human would swap out the pieces in a single hand motion, in known magnetic game boards the existing piece may be knocked over or simply pushed out of the way, or else a number of distinct and relatively inelegant and time-consuming manoeuvres may be required to effect the swap. For instance, the existing game piece may first need to move off the board to clear the destination square (which itself may be complicated/compromised if there are other pieces obstructing the board), with the selected piece only then moving to the destination square. Such manoeuvres, in addition to being drawn-out and unappealing to watch, also detract from the "realistic"/"authentic" feel of the game and/or are potentially confusing. For instance, the "outgoing" pieces may appear to be moving in ways that do not accord with the movements ordinarily permitted by the rules of the game; and this may be compounded by the fact that it is not immediately apparent that a given piece is leaving the board as opposed to making a bona fide move.

It is accordingly an object of the invention to provide an automated game board that mitigates one or more of the shortcomings of the prior art; or at least to offer the public a useful choice.

STATEMENTS OF THE INVENTION

According to one aspect of the invention, there is provided an automated game board apparatus comprising:
a server comprising a processor and a memory;
a game board comprising a plurality of segments defined by boundaries; and
a plurality of game pieces configured to, in use, be disposed substantially centrally on the plurality of segments, wherein at least some of the segments and at least some of the game pieces are configured such that, if two adjacent or diagonal segments are occupied by game pieces, another game piece can pass between them;
the server configured to, on receiving a command from a player involving a selected game piece, determine whether the command is valid in accordance with the rules of the game, and, if the command is valid, determine a path for moving the selected game piece from its origin segment to a destination segment as indicated by the command; the server being further configured to determine whether the path is valid, and, if the path is valid:
cause the apparatus to automatically move the selected game piece from the origin segment to the destination segment;
wherein, if one or more segments along the path are occupied by other game pieces, the apparatus is configured to move the selected game piece along at least a portion of the boundary of the occupied segment(s),
wherein, if the destination segment is occupied by an existing game piece, the apparatus is further configured to automatically replace the existing game piece with the selected game piece by moving the existing game piece to substantially the boundary of the destination segment and moving the selected game piece to substantially the centre of the destination segment.

Preferably, all of the segments and all of the game pieces are configured such that, if two adjacent or diagonal segments are occupied by game pieces, another game piece can pass between them.

Preferably, the path is determined by: the shortest possible route; and/or the rules of the game.

Preferably, whether the path is valid is determined by one or more of: the rules of the game; and/or, if one or more segments along the path are occupied by other game pieces, whether the selected game piece can pass along the boundary of the occupied segment(s).

Preferably, the automatic movement is achieved via electromagnets on the game pieces configured to selectively cooperate with electromagnets associated with the game board.

More preferably, the automatic movement is achieved via correlated electromagnet array technology (CEAT), wherein the game pieces comprise correlated magnets and the game board comprises an array of electromagnets.

Alternatively, the automatic movement is achieved via correlated magnets on the game pieces configured to selectively cooperate with correlated magnets associated with the game board.

Preferably, the selected game piece is caused to levitate a relatively small distance off a surface of the board during movement of the selected game piece.

Preferably, when the existing game piece on the destination segment is being replaced with the selected game piece, movement of the existing game piece to the boundary of the destination segment and movement of the selected game piece to the centre of the destination segment occur substantially simultaneously.

Preferably, the apparatus comprises a mover plate disposed under the game board, wherein, in use, the server positions the mover plate under the selected game piece, and then causes the mover plate to move from the origin segment to the destination segment, causing the selected piece to move along with it.

Preferably, the mover plate is actuated by a drive motor and a pair of drive shafts, the drive motor being in communication with the server.

Preferably, if the destination segment is occupied by an existing game piece, the server causes the mover plate to come to rest under the existing game piece, and then causes the mover plate to rotate (actually or effectively), such that the existing game piece is moved to the boundary of the destination segment and the selected game piece is simultaneously moved to the centre of the destination segment.

More preferably, in order to maintain a desired orientation of the selected game piece, the server causes the mover plate and thereby the selected game piece to undertake a preliminary rotation (actual or effective) at the origin segment, said preliminary rotation being equal but opposite to the subsequent rotation at the destination segment.

According to another aspect of the invention, there is provided a game board for use in an apparatus substantially as described above.

According to another aspect of the invention, there is provided a game piece for use in an apparatus substantially as described above.

According to another aspect of the invention, there is provided a server for use in an apparatus substantially as described above.

The present invention provides a number of advantages over the prior art, including, in some embodiments:
- Providing an automated game board capable of comprehensively, accurately and elegantly replicating movements of game pieces on a game board;
- Including in the presence of complicating factors such as other game pieces obstructing the route of the game piece;
- And including being able to replicate relatively complex manoeuvres such as swapping/switching out game pieces at the "destination" segment; and
- At the very least, providing the public with a useful choice.

BRIEF DESCRIPTION OF FIGURES

Further aspects and advantages of the invention will become apparent with reference to the accompanying Figures, which are given by way of non-limiting example only and in which:

FIG. 7B(1) is another schematic demonstrating how some of the segments and game pieces might be sized so as to prevent the formation of a valid path therebetween;

FIGS. 10A, & 10B(1) & 10B(2) are schematics showing cross-sectional side-views of the moving plate.

DETAILED DESCRIPTION OF FIGURES

FIGS. 1, 2A, 2B, 2C, 3, 4A, 4B, 7A and 7B are exemplary depictions to illustrate the working of the apparatus of the invention, and do not represent any specific board game with any specific rules except for those assumed in the following discussion for purposes of explanation.

Figure 5:
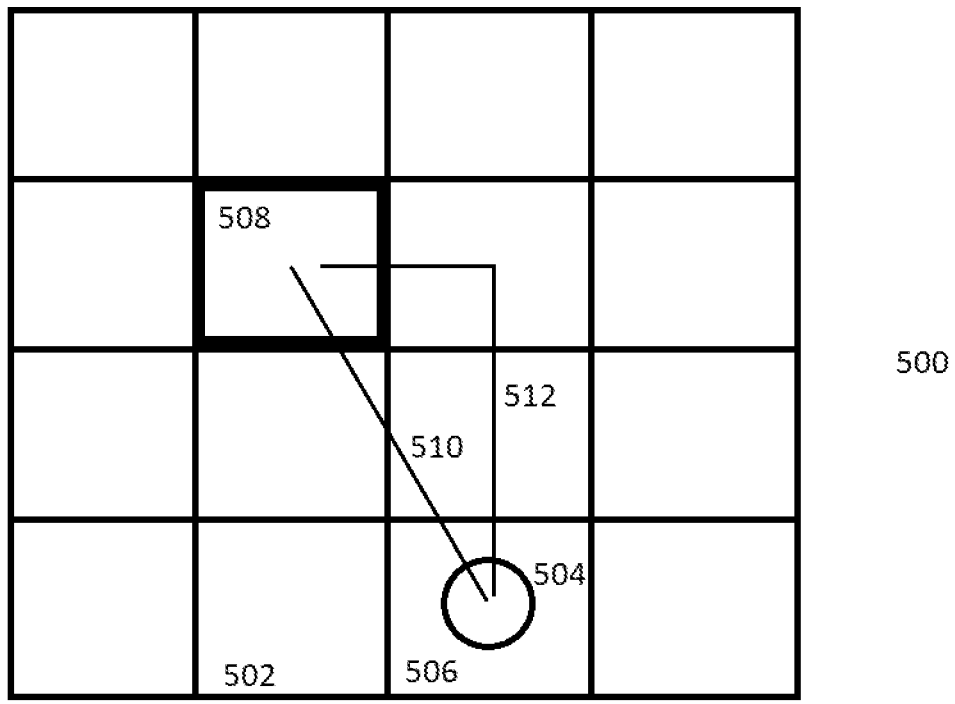
FIG. 5 is a schematic showing how the automated game board apparatus of the present invention might be programmed to move a knight on a chessboard, where the path according to chess rules is unobstructed.
Figure 6:
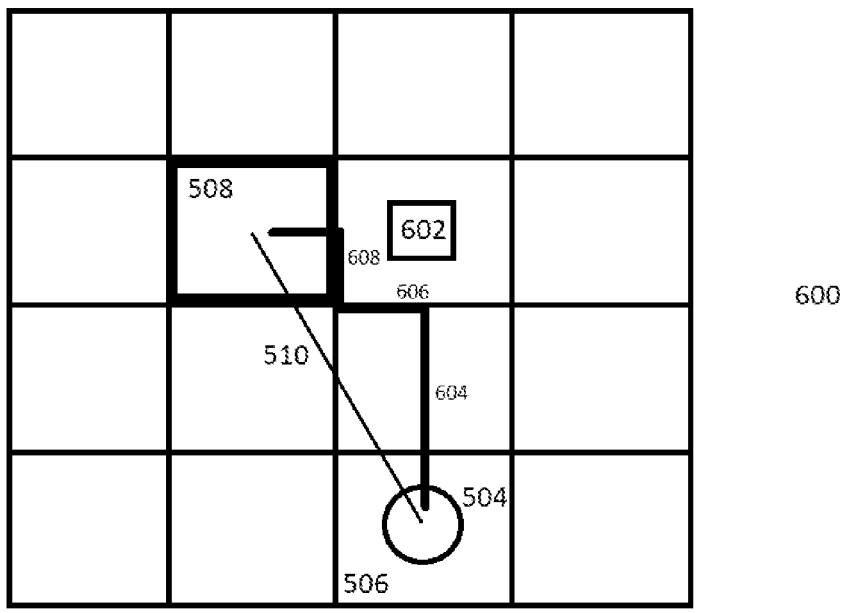
FIG. 6 is a schematic showing how the automated game board apparatus of the present invention might be programmed to move a knight on a chessboard, where the path according to chess rules is obstructed by another piece.

In FIGS. 5 and 6, reference is made to chess specifically. FIGS. 8A, 8B, 9, 10A, 10B(1) and 10B(2) are also with chess in mind but are equally applicable to other board games. The invention is particularly suited to chess, but may be adapted for use with a wide range of board games.

Determination of Path, Et Cetera

Figure 1:
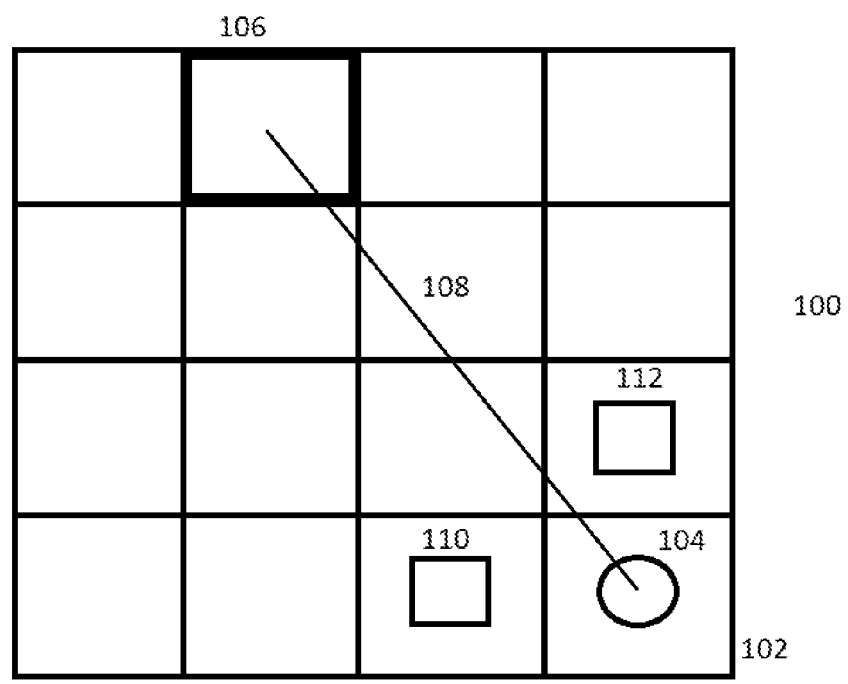
FIG. 1 is a schematic showing the automated game board apparatus of the present invention moving a selected piece from an origin segment to an empty destination segment with no obstructing pieces along the path.

Turning to FIG. 1, this shows an apparatus including a game board (100) having a plurality of square segments (102, 106) of equal size, the apparatus further including a plurality of game pieces (104, 110, 112) configured to be centrally positioned on the square segments. In this embodiment, all of the game pieces can be assumed to have a uniform footprint. The maximum width of the game pieces is at most half of the width of the square segments. This ensures that, if any two adjacent squares are occupied by game pieces, a "moving" piece can pass between them.

Figure 7A:
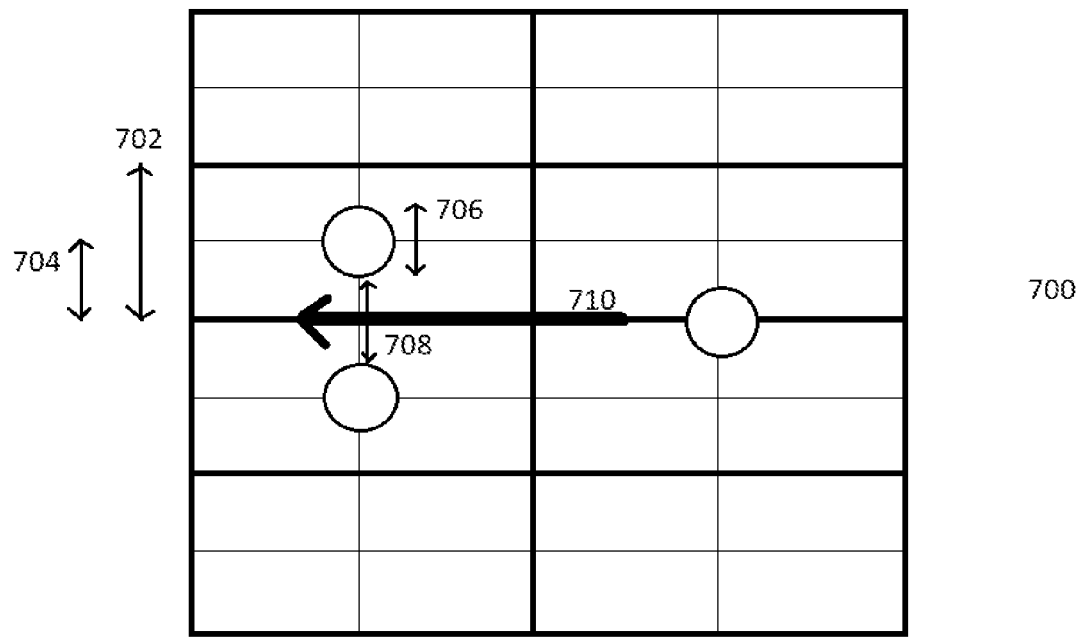
FIG. 7A is a schematic demonstrating how the segments and game pieces might be relatively sized in a game board having non-square segments.
Figure 7B:
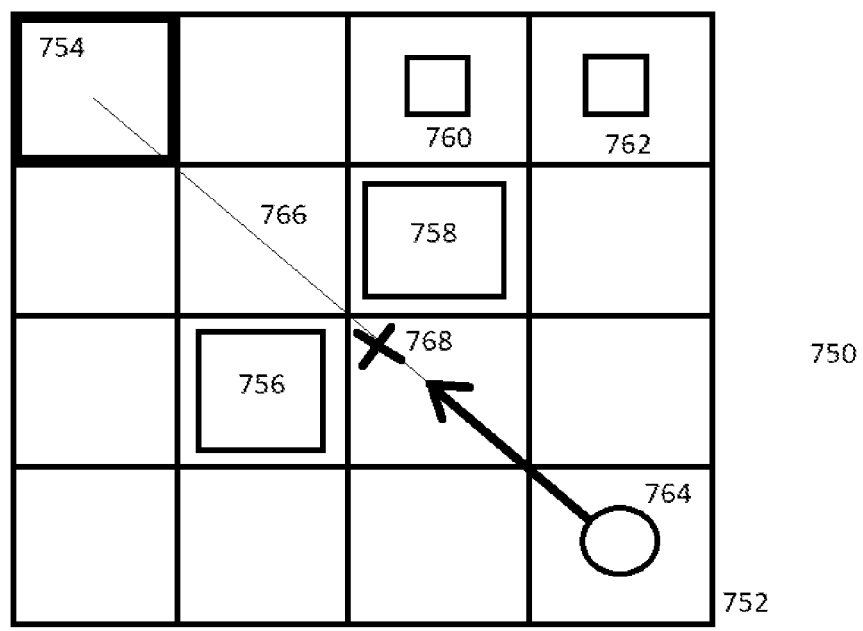
FIG. 7B is a schematic demonstrating how some of the segments and game pieces might be sized so as to prevent the formation of a valid path therebetween.

Note that this can also be achieved if the segments are non-square. An example of this is shown in FIG. 7A, with a game board (700) having rectangular segments. As long as the maximum width (706) of the game pieces is less than half (704) of the minimum width (702) of the sectors, there will be sufficient room (708) for a "moving" piece to pass between pieces occupying adjacent squares.

This could also be achieved in the case of a game board having non-uniform segments and/or different-sized game pieces. As long as it were ensured that the maximum width of the largest game piece was less than half of the minimum width of the smallest segment, then any two game pieces placed centrally on any two adjacent segments should allow sufficient room between them for a "moving" piece to pass through.

However, it is also within the scope of the invention for the rules of a particular game to dictate that not all adjacently-occupied segments are "passable" in this manner. For example, in FIG. 7B a game board (750) is shown having uniform, square segments but game pieces of two different sizes: small pieces (760, 762, 764) having a width less than half the width of the squares; and large pieces (756, 758) having a size close to that of the squares. Pieces (756, 758) do not leave sufficient room for the selected piece (764) to pass between them. As such, the server (not shown), when determining a putative path (766) from the origin segment (752) to the destination segment (754), would recognize that said path is not valid or available (768) in accordance with the rules of the game. (In some embodiments, it is conceivable that a "detour" route would be available to the player, depending on the rules of the game).

For completeness, we note that the same principle would hold true if the selected game piece were not travelling directly along the putative path, but were forced to follow a segment boundary along a portion of its route. For instance, in FIG. 7B(1), the putative path (indicated by thin line 766A) from the origin square (752) to the destination square (772) is obstructed by game piece (758), so the actual route taken by the selected piece (764) will need to follow the boundary of the obstructed square. This boundary is impassable, as there are two adjacent large pieces (758, 770) on either side of the boundary, leaving too little room between them and hence preventing passage by the selected game piece (758) as indicated by the thick black boundary line. Once again, the server would recognize that the route is therefore not valid, and accordingly that the corresponding putative path (776A) is also not valid.

Returning to FIG. 1, the apparatus comprises a server (not shown) capable of identifying the identity and location (and, if applicable, any relevant parameters) of each game piece (104, 110, 112) on the game board (100), as well as the location of the boundaries of the segments of the game board. This may be achieved in a variety of ways, for instance via electronic communication between, on the one hand, the server, and on the other hand the game board and game pieces. The skilled person will envisage suitable ways of configuring the apparatus in this regard.

The server (not shown) has received a command from a player (not shown) to move the selected piece (104) from the origin square (102) to the destination square (106) (which is unoccupied). The player might enter the command via, for example, an app on a smart phone, or another suitable programme configured to communicate with the server, as will be readily envisaged by one skilled in the art. The command might also be received indirectly from a player (i.e. from a player who is not the actual owner of the apparatus). For instance, the apparatus may be being used to animate, such as in real-time, a professional game being played by two players. If the professional game is keyed in to the apparatus of the present invention, a follower of the game may be able to simultaneously watch the professional game (such as on television or via live-streaming), and have a 3D version of the game play out in front of them as the professional players' moves are relayed to the apparatus and the game pieces move accordingly on the game board.

It is assumed here that the issued command is valid in accordance with the rules of the game. If the command is not valid in accordance with the rules of the game, this could be communicated to the player, for instance via an error message stating that the command, and/or the putative path corresponding thereto, is not valid. For instance, if in FIG. 5 (discussed in detail below) the player (not shown) commanded that the knight (504) be moved from square 506 to adjacent square 502, an error message might be displayed. Similar might be the case if the rules of the game stipulate that, for instance, a given piece can't move through an obstruction such as an opponent's piece.

In the FIG. 1 example, the command being valid, the server (not shown) proceeds to determine a path for moving the selected game piece (104) from the origin square (102) to the destination square (106).

Calculation of the path may depend on a number of different factors. For instance, the apparatus might be configured to simply calculate the shortest possible route between the origin and destination squares. Alternatively, the apparatus might be configured to take into account the rules of the game, mimicking how a particular piece is allowed to move. This is illustrated in FIG. 5 (which shows movement of the knight (504) in a case where all the intermediate squares are empty). Line 510 represents a path calculated on a "shortest possible route" basis between the origin (506) and destination (508) square. Line 512 represents a path that mimics the actual path the knight (504) should take across the board. Following path 512 would mean the players would actually see the knight (504) moving in the authentic L-shape.

In the FIG. 1 embodiment, the path is calculated on a "shortest possible route" basis, as indicated by line 108. Since the squares along the path are all empty, the selected piece (104) is able to follow the path exactly. As discussed next, this would not be the case if one or more of the intermediate squares were occupied by other game pieces.

The apparatus is configured to automatically move the selected piece (104) from the origin square (102) to the destination square (106), in the manner discussed further below.

Figure 2A:
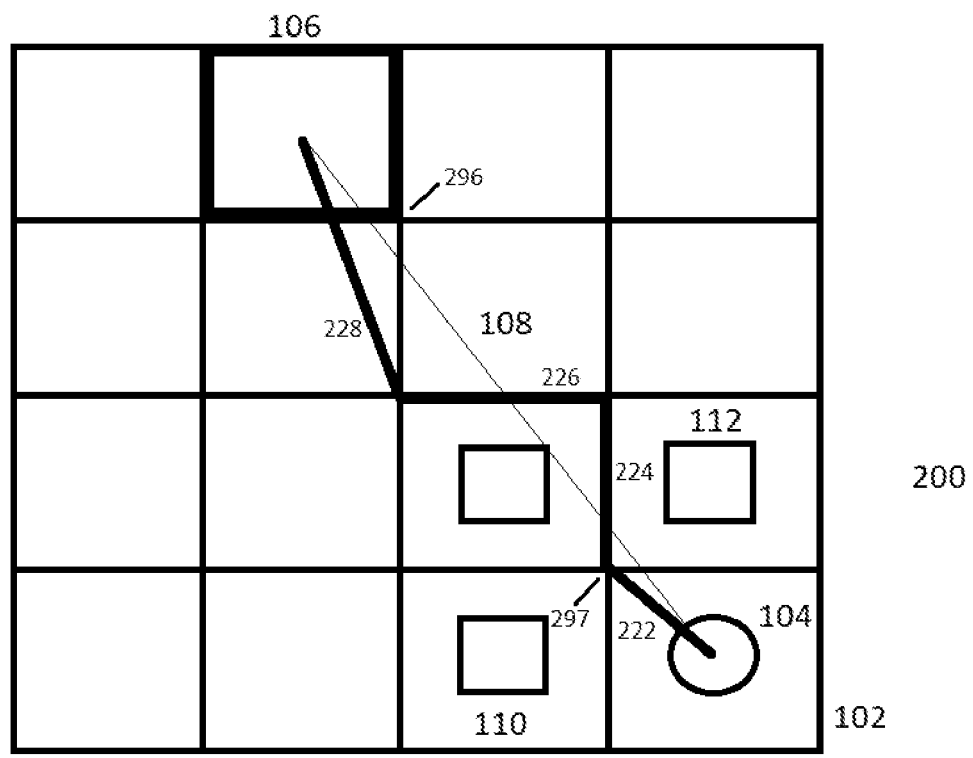
FIGS. 2A, 2B & 2C are schematics showing various ways in which the automated game board apparatus of the present invention might move a selected piece from an origin segment to an empty destination segment when a segment along the path is occupied by another game piece.
Figure 2B:
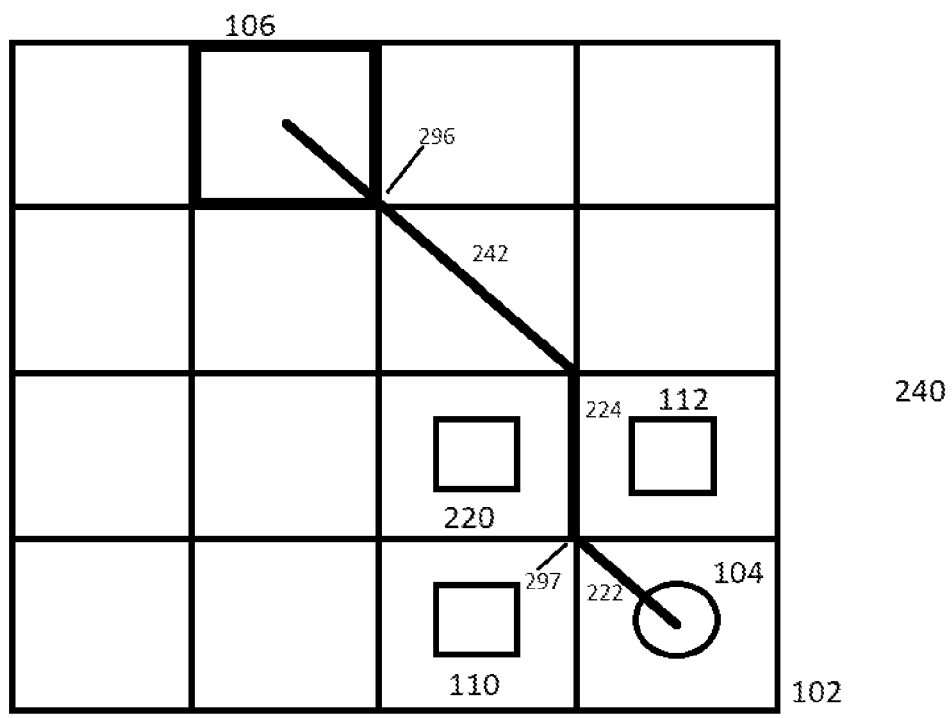
Figure 2C:
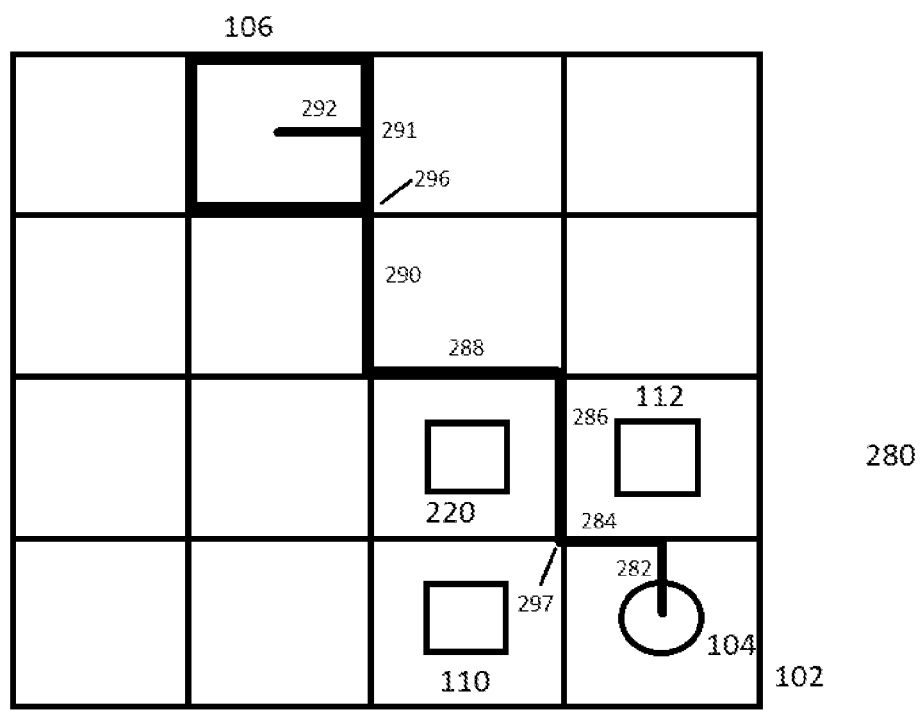

FIGS. 2A-2C illustrate a situation similar to that of FIG. 1, but in this case with a game piece (220) obstructing the putative path of FIG. 1 (thin line 108) between the origin (102) and destination (106) square. (For present purposes is assumed that the rules of the game allow the selected piece (104) to make such a move in spite of the obstructing piece (220)).

In this case, the selected piece (104) cannot travel directly along the path (i.e. putative path, 108). Rather, it must proceed along at least a portion of the boundary of the square hosting the obstructing piece (220). As FIGS. 2A-2C show, the apparatus may be configured to effect this in various ways. In FIG. 2A, the selected piece first travels (222) to the corner of the origin square; then proceeds about the vertical and horizontal boundary (224, 226) of the occupied square; then cuts across (228) from the corner of the occupied square to the destination square (106). In FIG. 2B, the difference is that the selected piece only travels along the vertical boundary (224) of the occupied square, then cuts across (242) to the destination square (106).

In FIG. 2C the boundaries are adhered to throughout the move: the selected piece (104) moves first (282) to the closest boundary of the origin square (102); along the boundary (284) and up and along (286, 288) the vertical and horizontal boundary of the occupied square; then along a boundary of a further unoccupied square and part of the boundary of the destination square (290), then finally (292) from the midpoint (291) of the destination square (106) to the centre of same.

The skilled person will appreciate that selection of a specific route (such as those exemplified in FIGS. 2A-2C) in cases where there is an occupied square obstructing the putative path will be a matter of how the apparatus is programmed. The apparatus may be configured to favour one type of route over another, depending on the algorithms it is programmed to use. One example of an applicable algorithm might be that, where the selected game piece must travel along the boundary of an obstructed square, the apparatus is configured to adhere to the boundary only to the extent necessary to avoid the obstruction, while otherwise adhering to the "shortest possible path" principle (and FIG. 2B is an example of this). Alternatively, and perhaps for simplicity's sake, the applicable algorithm might be that, if boundaries must be adhered to, this is done across the full journey of the selected piece from the origin square to the destination square (and FIG. 2C is an example of this). Still another algorithm might be that the boundaries are selected so as to most closely align with the original (i.e. putative) path, i.e. to deviate from the originally mapped path by as little as possible. Other algorithms are of course possible and may be envisaged by one skilled in the art.

Likewise, where travel along boundaries of an occupied square is required, the selection of which boundaries to travel along will be a matter of programming; for instance in accordance with the "shortest possible path" principle. This is illustrated in, for instance, FIG. 6, where travel along boundaries 606, 608 of the occupied square is clearly shorter than going the "long way round" the occupied square. In other cases, such as FIGS. 2A and 2C, it would not make a difference to route length if the other two boundaries of the occupied square were travelled along instead.

Note that, if replacement/swapping out of pieces were required at the destination square (106) using a mover plate as discussed below (see FIGS. 4A and 4B), the selected piece (104) would preferably stop at the corner (296) of the destination square (and similar applies to FIGS. 1, 3, 5 and 6). Furthermore, in cases requiring replacement/swapping out at the destination square using a mover plate, and also requiring the pieces to face in a particular direction, the selected piece would first need to be rotated to the corner (297) of the origin square (and similar applies to FIGS. 1, 3, 5 and 6); this is discussed below with reference to FIGS. 4C and 4D.

Figure 3:
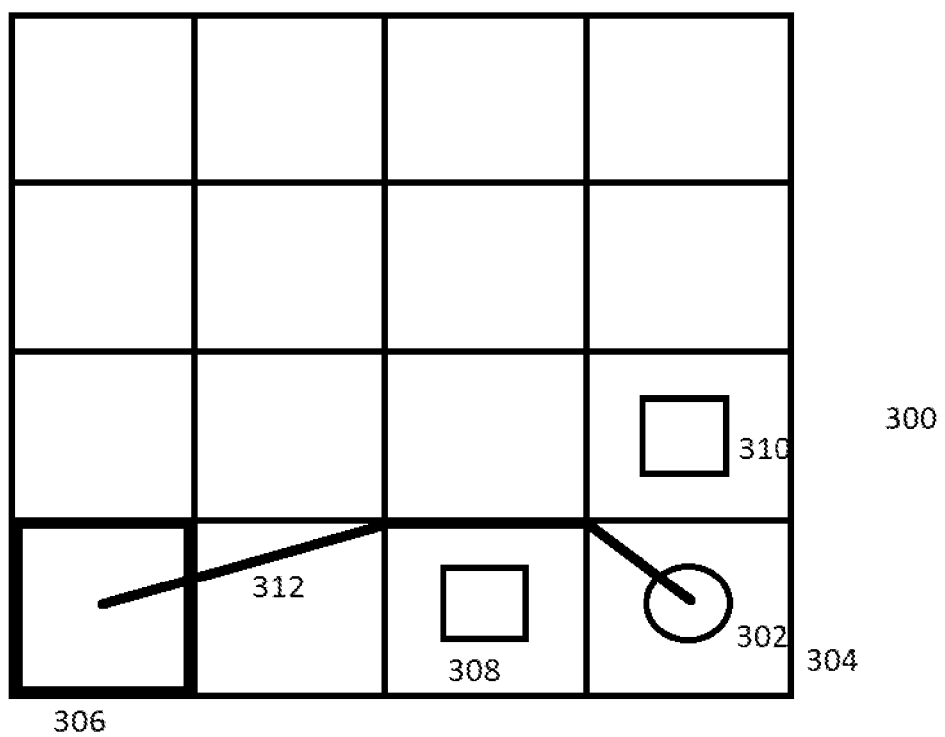
FIG. 3 is another schematic showing the automated game board apparatus of the present invention moving a selected piece from an origin segment to an empty destination segment wherein a segment along the path is occupied by another game piece.

FIG. 3 is another schematic showing the apparatus moving (312) the selected piece (302) from an origin square (304) to a destination square (306), avoiding an intermediate piece (308) obstructing the putative path by proceeding around the boundaries of the occupied square.

FIG. 6 illustrates this principle as applied to the knight (504) of FIG. 5. In this case, an additional game piece (602) is on the game board (600) and obstructs the knight's (504) proper L-shaped path of movement. If the apparatus is configured to select the path according to the "shortest possible route" methodology, then the path (510) will be unchanged from FIG. 5. However, if the path is selected so as to emulate the actual L-shaped movement of the knight according to the rules of the game (as indicated by 512 in FIG. 5), then the additional game piece (602) obstructs this path. Accordingly, to move the knight (504) in accordance with its path (512), the apparatus will move the knight (504) to the boundary of the square occupied by the obstructing piece (602), then along its boundaries (606, 608) and into the centre of the destination square (508).

Automatic Movement/Replacement of Pieces

Mover Plate

In one preferred exemplary embodiment, automatic movement of the selected piece (and, if applicable, swapping out of game pieces at the destination square) is effected via a mover plate disposed beneath the game board; said mover plate being configured to cooperate with the selected game piece via electromagnetics, correlated electromagnetic array technology (CEAT), and/or correlated magnets, as discussed below.

Figure 8A:
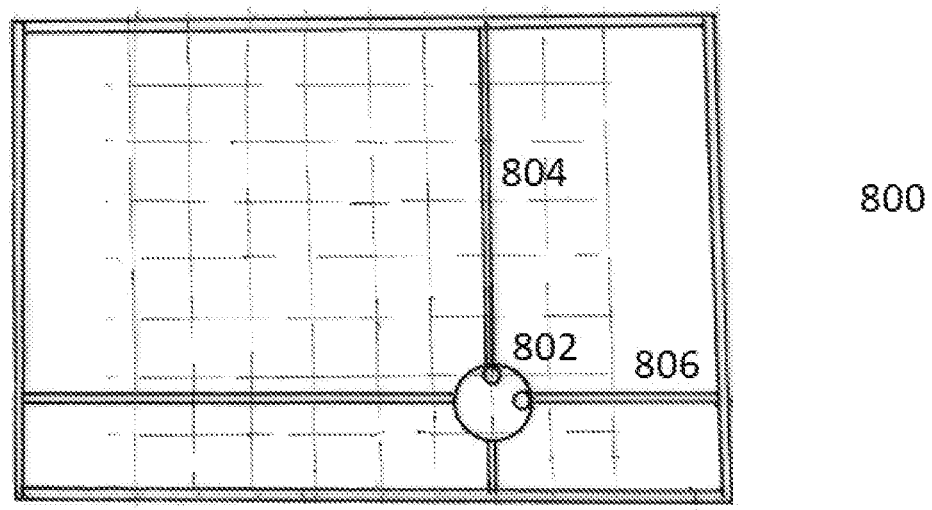
FIGS. 8A & 8B are schematics showing the moving plate of the automated game board apparatus of the present invention in, respectively, transparent plan view and side view.
Figure 8B:
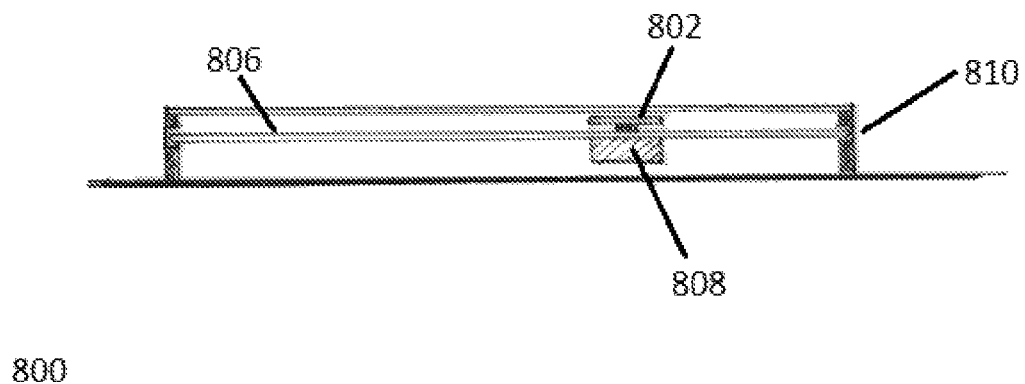
Figure 9:
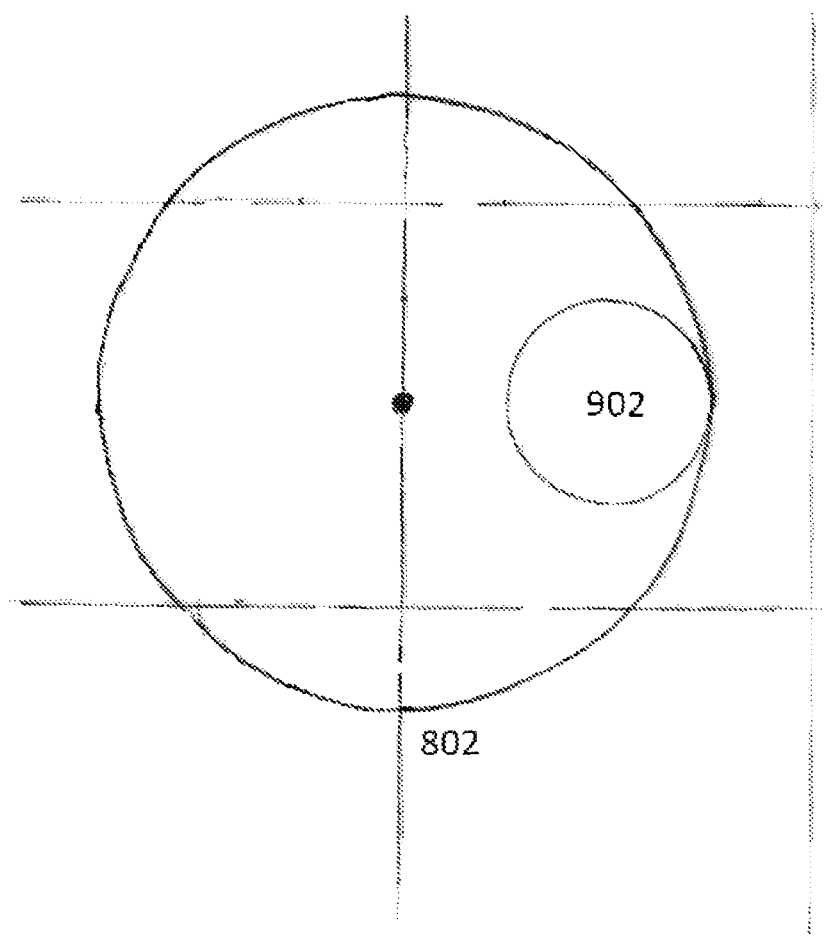
FIG. 9 is a schematic showing the moving plate replacing an existing piece with a selected piece on a segment of a game board.

FIGS. 8A and 8B are schematics showing an exemplary construction of a game board (800) comprising a mover plate (802). In this embodiment, the mover plate (802) is actuated by a drive motor (808) in communication with the server, and a pair of drive shafts (804), (806) disposed in guide slots (810) and configured to urge the mover plate (802) along and across the board as required (the skilled person may envisage other ways of configuring the actuation means; for instance, a single drive shaft may be possible). In some embodiments, provision may also be made for rotation of the mover plate (802); though in other embodiments, as discussed below, actual rotation of the mover plate may not be necessary. The skilled person will readily identify other suitable ways in which the mover plate may be actuated.

On receipt by the server of the command from the player, the server causes the mover plate to move to the origin segment, such that it is positioned under the selected game piece. Preferably—and particularly if "swapping out" will be required at the destination square—the mover plate is positioned such that the selected game piece abuts its circumference, as shown by 902 in FIG. 9. However, this is not intended to be limiting. For instance, if the destination square is empty (i.e. no "swapping out" is required), the mover plate could be otherwise oriented with respect to the selected game piece.

The server then causes the mover plate to move to the destination segment; thereby causing the selected piece to move together with it along the appropriately-determined path (as discussed above). Movement of the selected game piece together with the mover plate is achieved via electromagnetics, correlated electromagnetic array technology (CEAT), and/or correlated magnets, as discussed below.

If the destination segment is unoccupied, the mover plate can simply deliver the selected game piece to the centre of the segment. If, on the other hand, the destination segment is occupied by an existing piece, "swapping out"/replacement will be required. In this situation, as noted above, the mover plate will firstly cause the selected game piece to come to rest at a corner of the destination segment, as indicated by 296 in FIGS. 2A-2C.

Figure 4A:
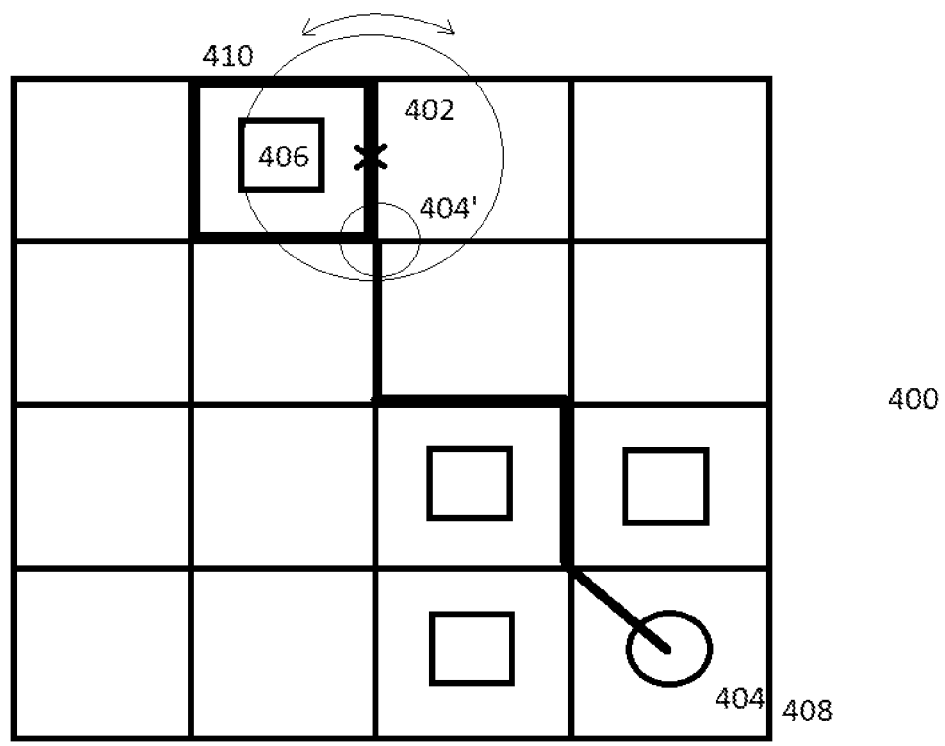
FIGS. 4A and 4B are schematics showing the automated game board apparatus of the present invention moving a selected piece from an origin segment to a destination segment that is occupied by an existing piece, and further using the moving plate to replace the existing piece with the selected piece.
Figure 4B:
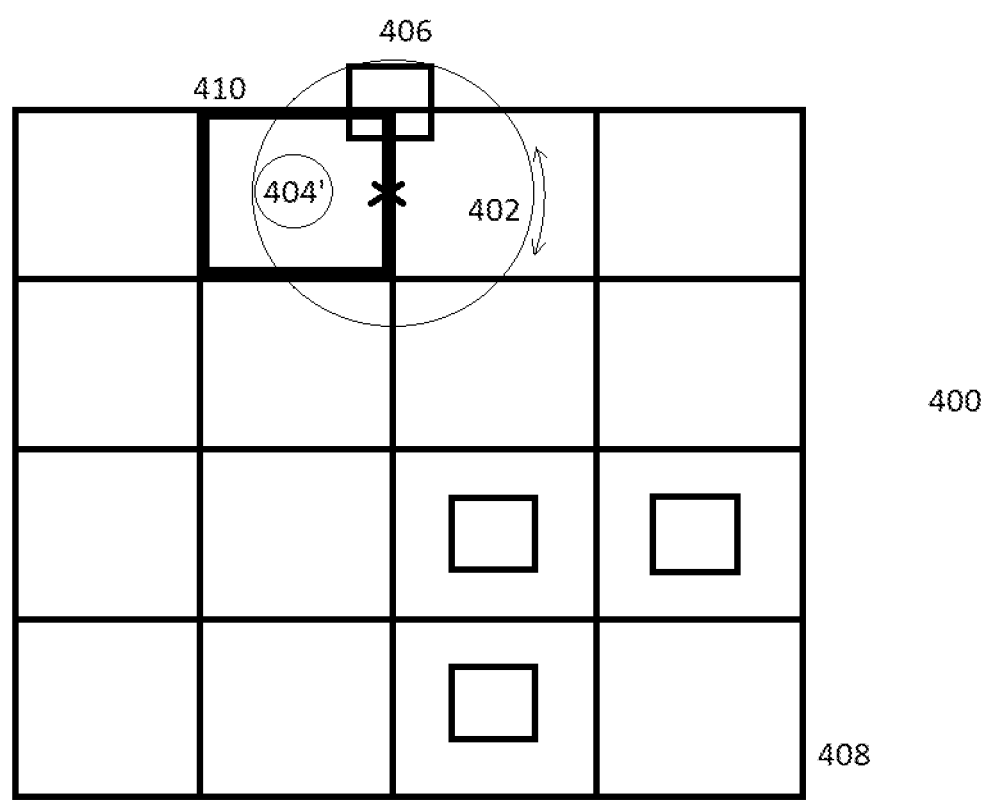

The reason for this is made clear by reference to FIGS. 4A and 4B, which show the mover plate (402) effecting a replacement at the destination segment. In FIG. 4A, the mover plate has moved the selected piece (404, 404') from its origin segment (408) to the corner of the destination segment (410). In doing so, the mover plate (402) has positioned itself such that its central axis (X) is substantially midway along the vertical boundary of the destination segment (410) (it will be appreciated that the mover plate (402) is appropriately sized and configured in this regard, relative to the segments and the game pieces). In this position, the mover plate (402) is also positioned under the game piece (406) occupying the destination square.

Once the mover plate (402) is so positioned, the existing game piece (406) is actuated with respect to the mover plate—again via electromagnetics, correlated electromagnetic array technology (CEAT), and/or correlated magnets, as discussed below. The mover plate then turns (actually or effectively) by 90°, as indicated by the arrow, causing the selected game piece (404') and the existing game piece (406) to simultaneously move to the new positions shown in FIG. 4B—namely, with game piece (406) now on a corner of the destination segment (410), and the selected game piece (404') at the centre of the destination segment (410). Thus, the original game piece has been replaced with the selected game piece. The original game piece now sits relatively unobstructively at the corner of the segment, and can optionally be removed from the game board by the player.

It should be noted that, while in the illustrated embodiment the respective game pieces (404', 406) are oriented at 90° relative to one another on the mover plate, and accordingly the mover plate rotates (actually or effectively) by 90° to effect the replacement, other angles may also be acceptable, depending on factors such as the size/shape of the game pieces. For instance, the relevant angle could instead be 45°.

It should also be noted that the mover plate can be configured to rotate clockwise and/or counterclockwise. For instance, the server may be configured to determine the most appropriate rotation direction, based on factors such as location of the origin and destination squares and the path being taken by the selected piece. In FIG. 4A, for example, it is more economical for the selected piece (404') to arrive at the right-hand corner of the destination square (410) than the left-hand corner; and accordingly, rotation of the mover plate to effect the swap takes place in a clockwise direction.

Also, rotation of the mover plate need not be solely for the purpose of effecting a swap/replacement. In some embodiments, rotation may also be used to change the orientation of the game pieces for other reasons, such as if game rules permit a game piece to change direction. For instance, if reversal of direction were required, rotation by 180° would be effected at the appropriate point in the game. Since this would have the effect of moving the selected piece into an adjacent segment, following rotation the mover plate would move linearly, to return the selected piece to its proper segment. (Of course, in embodiments (discussed below) where there is no mover plate, this could likewise be achieved.)

Obviously, in FIGS. 4A and 4B, in being rotated from the corner of the destination square (410) to its centre, the selected game piece (404') will also change its orientation by 90° (or whatever the angle of rotation might be in a given embodiment). This is acceptable in some games/situations, for instance where the orientation of the game pieces is irrelevant, or the pieces are symmetrical/uniform from every perspective.

However, in games such as chess, at least some of the pieces (knight, bishop) are not symmetrical yet have a prescribed orientation (facing towards the opponent's side of the board). In these situations, an additional step will be required to ensure the correct orientation of the game piece is maintained before and after the move.

Figure 4C:
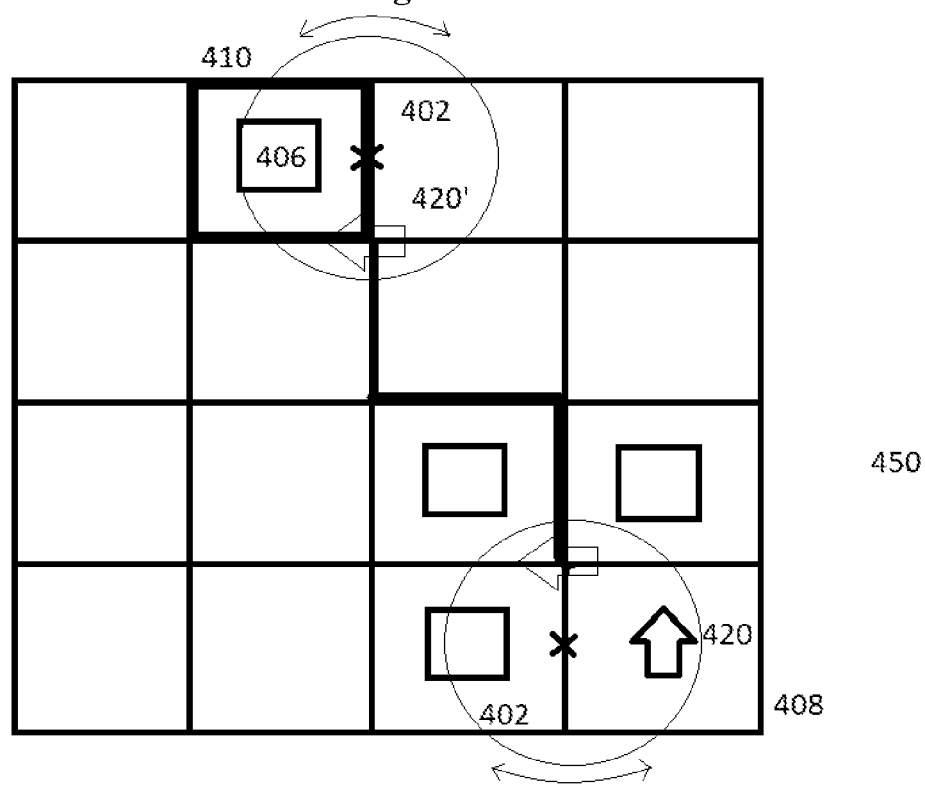
FIGS. 4C & 4D are schematics showing the automated game board apparatus performing the move of FIGS. 4A and 4B, but with additional action to maintain the correct orientation of the game piece.
Figure 4D:
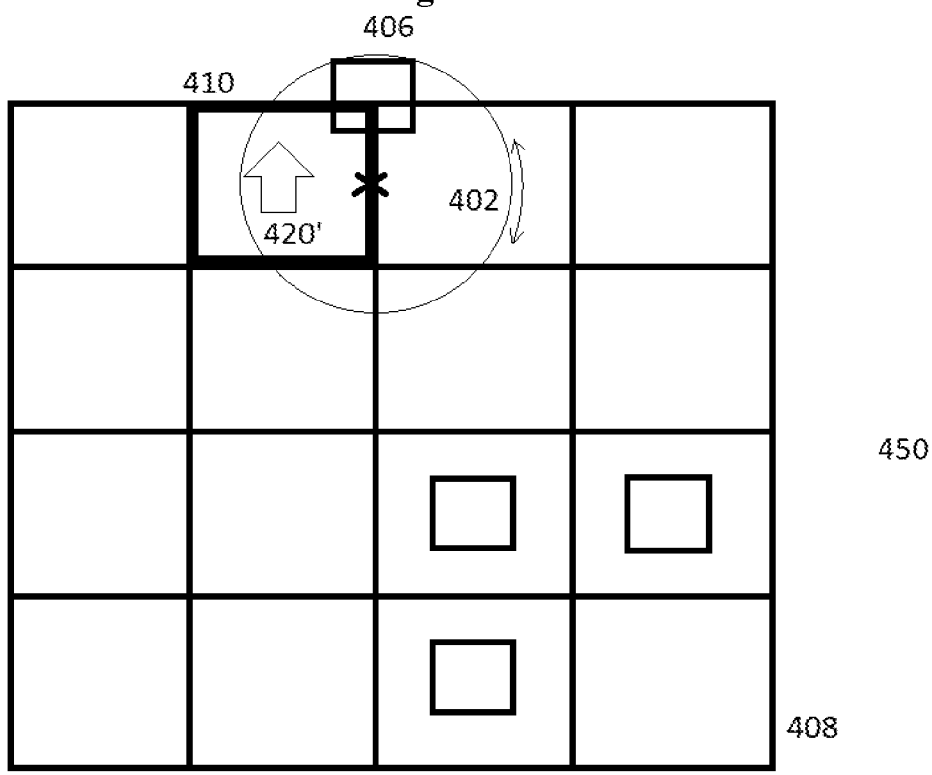

This is illustrated in FIGS. 4C and 4D, in which an asymmetrical game piece (represented by arrow 420) is shown for explanation purposes. In FIG. 4C, the mover plate (402) first rotates (in this case counterclockwise) the game piece (420) from the centre of the origin square (408) to its corner, causing the game piece (420) to change its orientation by 90° (to this end, the mover plate (402) has again positioned itself with its central axis (X) substantially midway along the vertical boundary of the origin square (408)). As before, the game piece (420') is then moved to the corner of the destination square (410) and, as shown in FIG. 4D, rotated (clockwise) into the centre of the destination square. But the preliminary rotation at the origin square "compensates" for the subsequent rotation at the destination square, meaning the game piece (420') maintains its correct orientation. As noted above, the server is configured to recognise the identity and parameters of a selected piece, including whether it is orientation-sensitive; and will determine the appropriate actions/route for the move accordingly.

Electromagnetics, Et Cetera

Figure 10A:
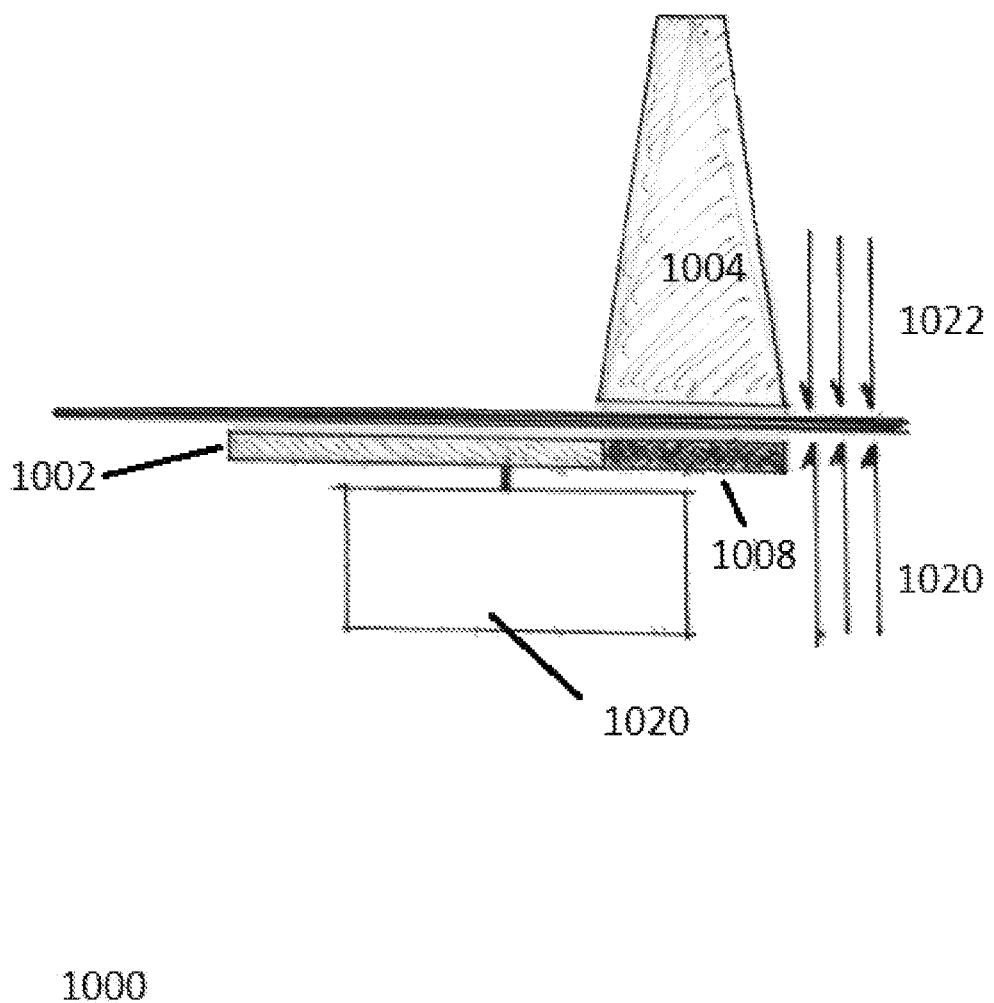

In a preferred exemplary embodiment, represented in FIGS. 10A, 10B(1) and 10B(2), the mover plate is configured to cooperate with the selected game piece (and, if applicable, the game piece being replaced) via correlated electromagnetic array technology (CEAT), as will now be discussed.

CEAT enables the precise moving of an item having an embedded "correlated magnet", relative to a substrate having an embedded "electromagnetic array" (i.e. a surface array of individual electromagnetic elements). Both correlated magnetics (marketed under the name Polymagnet™) and CEAT were developed by Correlated Magnetics Research LLC. Both technologies are described in, for instance, the following patent documents (the contents of which are incorporated herein by reference):

US2015357108A1—see for example [0051]-[0054] regarding CEAT, and [0048] regarding using correlated magnetics in combination with an external motor;

EP3185255A1—see for example [0065]-[0068] regarding CEAT; and the document as a whole regarding correlated magnetics; and US2013314184A1—see for example [0153]-[0157] regarding CEAT; and [0212] regarding selective demagnetization of correlated magnets.

The following are also incorporated by reference:

"Correlated Electromagnet Array Selected as Industry Game Changer", Nanowerk News, Mar. 20, 2011; available at: https://www.nanowerk.com/news/newsid=20615.php YouTube video demonstrating different types of Polymagnets™: https://www.youtube.com/watch?v=ZLZMJYqEdQw With reference to FIG. 10A, the apparatus according to a preferred exemplary embodiment of the invention utilizes CEAT as follows. In the mover plate (1002) (which again has a drive motor (1020) communicable with the server) is embedded an "electromagnetic array" (not shown, but configured similarly to that shown in the Nanowerk article referenced above). In the game piece (1004) are embedded correlated magnets (Polymagnets™) of an appropriate type.

When it is desired to move a game piece (1004), the server (not shown) actuates (i.e. causes a change in the polarity of) a portion (1008) of the electromagnetic array under the game piece (1004), to thereby cause that portion (1008) of the mover plate (1002) and the game piece (1004) to cooperate with each other, as schematically indicated by arrows (1020) and (1022).

In this embodiment, the correlated magnet in the game piece (1004) is of the type "spring Polymagnet™" (though other types may also be suitable). This type of Polymagnet™ causes a "repel" force up to a threshold distance, after which an "attract" force is generated. This has the effect that one object "hovers" in place above another. Thus, when the portion (1008) of the electromagnetic array is actuated, the spring Polymagnet™ in the game piece (1004) will cause the game piece (1004) to levitate a small distance above the game board (1000), as shown. (Levitation, while not essential, is preferred as it promotes smooth movement of the game pieces across the board). Then, the drive motor and drive shafts cause the mover plate (1002) to move across the board to the destination segment as previously described; with the CEAT cooperation between the portion (1008) and the game piece causing the game piece (1004) to move together with the mover plate (1002).

FIGS. 10B(1) and 10B(2) show what happens at the destination square, assuming it is occupied by another piece (1006). As previously described, the mover plate (1002) positions itself such that it is disposed under the existing game piece (1006) as well as the selected game piece (1004). Initially, the existing game piece (1006) does not react to the mover plate since the portion (1010) of the electromagnetic array under the existing game piece (1006) has not yet been actuated. Thus, as shown in FIG. 10B(1), the existing game piece (1006) continues to sit on the board.

Upon actuation by the server of portion 1010 of the electromagnetic array (as shown in FIG. 10B(2)), the existing game piece (1006), assuming it likewise has a spring Polymagnet™, will levitate off the board. The game pieces (1004, 1006) will then be caused to rotate as previously described, to effect the swap-out.

Note, when using CEAT, rotation could be accomplished in one of two ways. Firstly, the mover plate (1002) could be caused to physically rotate (referred to herein as "actual rotation" of the mover plate), and with it the portions (1008, 1010) of the electromagnetic array. Alternatively, the mover plate (1002) could remain static but the position of portions 1008, 1010 could be varied relative to the surface array of the electromagnetic elements, similar to the depiction in the above-cited Nanowerk article, to emulate rotation (referred to herein as "effective rotation" of the mover plate). Furthermore, if using the latter technique, the swap need not necessarily be "rotary" in nature at all, but might instead follow a linear (or any other) path.

A further important note regarding the use of CEAT in the present invention is that embodiments are possible where there is no mover plate at all. Instead, the entire game board could contain an embedded electromagnetic array. The portion of the array under the selected game piece could be actuated, causing interaction with the correlated magnet in the game piece as described above. The actuated portion could then be made to move across the surface array, from the origin segment to the destination segment, with the game piece following.

While CEAT is the preferred technology to be used in the present invention, alternatives are possible. For instance, the invention may be effected using ordinary electromagnets in both the game pieces and the mover plate. In use, at least the electromagnets in the game pieces would ordinarily be disabled, to avoid unintentional interaction with the mover plate. (Potentially, in some embodiments the electromagnet(s) in the mover plate might also be selectively enabled/disabled.) Upon positioning of the mover plate under the selected game piece, the electromagnet in the selected game piece would be actuated, causing it to cooperate electromagnetically with the electromagnet(s) in the mover plate.

It may also be possible to effect the invention using correlated magnetics (Polymagnets™) alone; that is to say, by having Polymagnets™ embedded in both the game pieces and the mover plate. There are a range of different Polymagnets™, all with different behaviours. In addition to spring Polymagnets™, there are also "latch" Polymagnets™ (which do the opposite, namely repel unless the objects are very close together, whereupon they attract); "twist-to-release" Polymagnets™, which transition from an attract force to a repel force every 90°; and "align" Polymagnets™, which have a varying amount of force as they rotate.

Conceivably, one or more types of Polymagnets™ could be embedded in the game pieces and the mover plate to effect the invention; particularly given that, as noted at [0212] of US2013314184A1, selective demagnetization of correlated magnets is possible.

Strictly by way of example and without wishing to be bound by science, the "spring" type of Polymagnet™ could be embedded in the game piece, with its opposite half embedded in the mover plate—but with one or both demagnetized until prompted by the server. Upon magnetization, this would cause levitation of the game piece, and then its movement across the board in pursuit of its opposite number in the mover plate. Alternatively or additionally, and again without wishing to be bound by science, the "latch" type could also be used to effectively "push" the game piece to the destination segment by means of its repel force; while the "twist-to-release" and/or "align" types could potentially be used for swapping out the pieces at the destination square.

It will of course be realized that while the foregoing has been given by way of illustrative example of this invention, all such and other modifications and variations thereto as would be apparent to persons skilled in the art are deemed to fall within the broad scope and ambit of this invention as is hereinbefore described.

If any reference numeral(s) is/are used in a claim or claims then such reference numeral(s) should not be considered as limiting the scope of that respective claim or claims(s) to any particular embodiment of the drawings.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. it will be taken to mean an inclusion of not only the listed components it directly references, but also other non-specified components or elements. This rationale will also be used when the term 'comprised' or 'comprising' is used in relation to one or more steps in a method or process.

The invention claimed is:

1. An automated game board apparatus comprising:
a server comprising a processor and a memory;
a game board comprising a plurality of segments defined by boundaries; and
a plurality of game pieces configured to, in use, be disposed substantially centrally on the plurality of segments, wherein at least some of the segments and at least some of the game pieces are configured such that, if two adjacent or diagonal segments are occupied by game pieces, another game piece can pass between them;
the server configured to, on receiving a command from a player involving a selected game piece, determine whether the command is valid in accordance with the rules of the game, and, if the command is valid, determine a path for moving the selected game piece from its origin segment to a destination segment as indicated by the command; the server being further configured to determine whether the path is valid, and, if the path is valid:

cause the apparatus to automatically move the selected game piece from the origin segment to the destination segment;

wherein, if one or more segments along the path are occupied by other game pieces, the apparatus is configured to move the selected game piece along at least a portion of the boundary of the occupied segment(s), wherein, if the destination segment is occupied by an existing game piece, the apparatus is further configured to automatically replace the existing game piece with the selected game piece by moving the existing game piece to substantially the boundary of the destination segment and moving the selected game piece to substantially the centre of the destination segment.

2. The apparatus of claim 1, wherein all of the segments and all of the game pieces are configured such that, if two adjacent or diagonal segments are occupied by game pieces, another game piece can pass between them.

3. The apparatus of claim 1, wherein the path is determined by one of: the shortest possible route; and/or the rules of the game.

4. The apparatus of claim 1, wherein whether the path is valid is determined by one or more of: the rules of the game; and/or, if one or more segments along the path are occupied by other game pieces, whether the selected game piece can pass along the boundary of the occupied segment(s).

5. The apparatus of claim 1, wherein the automatic movement is achieved via electromagnets on the game pieces configured to selectively cooperate with electromagnets associated with the game board.

6. The apparatus of claim 1, wherein the automatic movement is achieved via correlated electromagnet array technology (CEAT), wherein the game pieces comprise correlated magnets and the game board comprises an array of electromagnets associated therewith.

7. The apparatus of claim 6, wherein automatic movement is achieved by selectively actuating, via the server, a portion of the array of electromagnets associated with the game board and proximate the selected game piece, such that the actuated electromagnets cooperate with the correlated magnet on the selected game piece; and subsequently moving the actuated electromagnets relative to the game board, from the origin square to the destination square, such that the game piece moves together with the actuated electromagnets.

8. The apparatus of claim 1, wherein the automatic movement is achieved via correlated magnets on the game pieces configured to selectively cooperate with correlated magnets associated with the game board.

9. The apparatus of claim 1, wherein the selected game piece is caused to levitate a relatively small distance off a surface of the game board during movement of the selected game piece.

10. The apparatus of claim 1, wherein, when the existing game piece on the destination segment is being replaced with the selected game piece, movement of the existing game piece to substantially the boundary of the destination segment and movement of the selected game piece to substantially the centre of the destination segment occur substantially simultaneously.

11. The apparatus of claim 1, wherein, the apparatus comprises a mover plate disposed under the game board, wherein, in use, the server positions the mover plate under the selected game piece, and then causes the mover plate to move from the origin segment to the destination segment, causing the selected piece to move along with the mover plate.

12. The apparatus of claim 11, wherein the mover plate is actuated by a drive motor and a pair of drive shafts, the drive motor being in communication with the server.

13. The apparatus of claim 11, wherein, if the destination segment is occupied by an existing game piece, the server causes the mover plate to come to rest under the existing game piece, and then causes the mover plate to rotate (actually or effectively), such that the existing game piece is moved to substantially the boundary of the destination segment and the selected game piece is simultaneously moved to substantially the centre of the destination segment.

14. The apparatus of claim 13, wherein, in order to maintain a desired orientation of the selected game piece, the server causes the mover plate and thereby the selected game piece to undertake a preliminary rotation (actual or effective) at the origin segment, said preliminary rotation being equal but opposite to the subsequent rotation at the destination segment.

15. The apparatus of claim 11, wherein the array of electromagnets are disposed on the mover plate.

* * * * *